INTERPOLATION SIGNALING
Filed Dec. 29, 1961
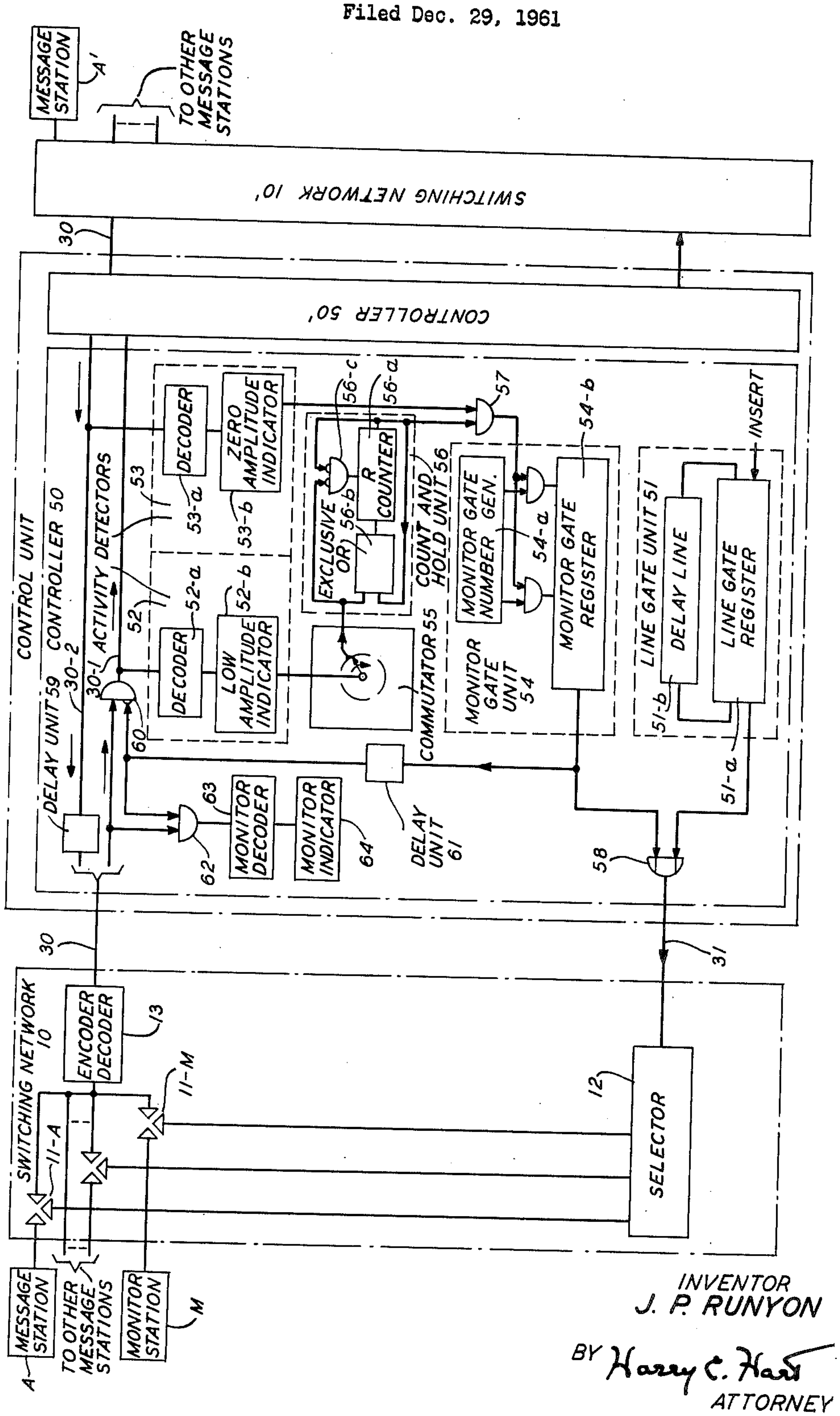
INVENTOR
J. P. RUNYON
BY Harry C. Hart
ATTORNEY

3,200,201
INTERPOLATION SIGNALING

John P. Runyon, Mendham, N.J., assignor to Bell Telephone Laboratories, Incorporated, New York, N.Y., a corporation of New York Filed Dec. 29, 1961, Ser. No. 163,287
9 Claims. (Cl. 179—15)

This invention relates to supplementary signaling, particularly in time division systems.

Supplementary signaling is incident to the message channel interchange of information among stations of a communications system. It is used, for example, in determining operating conditions throughout the system. On occasion this entails the interrogation of a remote part of the system and the receipt of a reply in response to the interrogation. Both the interrogation signaling and the reply signaling must be prevented from interfering with message channel activity.

Accordingly, it is an object of the invention to facilitate supplementary signaling in a communications system. A further object is to achieve two-way supplementary signaling without message channel interference.

While supplementary signaling can take place in a number of ways, the conventional ones are subject to objection. On the one hand, for example, the use of auxiliary channels or auxiliary transmission paths is at the expense of system complexity. On the other hand, the use of selected message channels causes an attendant reduction in system message capacity. In addition, when all message channels are in use, the latter kind of signaling is subject to a protracted delay pending channel availability. And where priority requests for service are to be determined, unserved stations must be interrogated even when all message channels are busy.

Consequently, it is a still further object of the invention to accomplish supplementary signaling without resort to auxiliary channels or auxiliary transmission paths. A companion object is to do so without detriment to the information handling capacity of a system. A still further object is to achieve supplementary signaling when all message channels are in use.

Supplementary signaling is of particular significance in a time division system where a plurality of concurrent messages—with the same baseband frequencies—are served by a single transmission path. Time division is possible because the information content of a continuous message can be recovered from successive samples of its wave. Hence, the samples from various waves, in respective message channels, can be interleaved without overlap and carried by the transmission path directly as PAM (Pulse Amplitude Modulation) signals. Or, to achieve enhanced transmission in the presence of noise, each sample can be encoded, for example, into a train of two-valued PCM (Pulse Code Modulation) signals that are permuted according to sample amplitude.

As a result, each sample, or its encoded counterpart occupies a so-called time slot interval that recurs at the sampling rate. The maximum number of concurrent messages in a time division system is given by the ratio of the channel recurrence interval to the time slot interval.

It is a yet further object of the invention to achieve communications signaling in a time division system without employing auxiliary signaling channels. Another object is to achieve two-way time division signaling when all message channels are in use.

To achieve the above and related objects, the invention provides for the interpolation of supplementary signals between the message constituents carried by a message channel. Interpolation takes place when a suitable condition of activity is detected on the channel.

With a low level of activity, the interference of the interpolated signals with ordinary message propagation is minimal. When the detected condition is one of recurrent inactivity a prediction of continued inactivity can be made so that the interpolated signals cause no interference at all. For speech messages a prediction of continued inactivity can be made from a limited number of recurrent amplitude levels falling below a prescribed threshold.

Where the auxiliary signals are interrogatory in nature and a reply is expected, the invention provides that detected conditions of low activity desirably occur simultaneously for messages transmitted in opposed directions of propagation. Then, the reply to an interrogation need not be stored until a subsequent interpolation occasion. Rather, the reply takes place directly and is readily identified as such at the point of origin of interrogation.

More particularly, in the time division aspect of the invention a prescribed condition of a propagated message is detected during the interval of a preassigned time slot and an auxiliary signal is instead propagated during that time slot. If similar message conditions are detected simultaneously for opposed directions of propagation during the same time slot, both the time division interrogation signaling and the reply signaling are initiated during that time slot, thus facilitating the association of the reply with the interrogation.

Other aspects of the invention will become apparent after consideration of an illustrative embodiment taken in conjunction with the drawing, of which the sole figure is a block diagram of a time division interpolation signaling system.

In the time division system of the figure, messages from stations connected to respective switching networks 10 and 10' are interchanged along a transmission link 30 under the direction of network controllers 50 and 50' within a central control unit.

Each interchange takes place during a prescribed and recurrent time slot interval according to the time division practice of Patent 2,957,949 issued October 25, 1960 to D. B. James et al.

Consider an interchange between two stations A and A' connected to the respective switching networks 10 and 10'.

At the left-hand network 10 the normally open line gate switch 11–A for the first station A is closed during an assigned time slot by a selector 12 that responds to a line gate unit 51 of the left-hand controller 50.

Briefly, the closure is accomplished by inserting a code group of control pulse signals into a register 51–A of the line gate unit. The control code group is shifted through the register until a read-out position is reached. Then the code constituents are dispatched over a control path 31 to the selector 12 where they are translated according to content. Subsequently, the inserted code group circulates in a delay line 51–*b* of the gate unit 51, reinitiating the earlier closure action each time it arrives at the register read-out position.

Similarly, during the assigned time slot, the second station A' is acted upon through the right-hand network 10' by its controller 50'.

With each closure of a gate switch 11 in the left-hand network 10, an encoder-decoder 13 unit processes both a received code group appearing on a lower path 30–1 of the transmission link or a sample of a message being sent along an upper path 30–2 of the link. Because of propagation delays, a dispatched code group will not reach its point of destination before the lapse of at least one "frame" or time slot cycle. Nevertheless, the system is synchronous in that time slot identity is preserved throughout.

For interpolation and reply signaling in accordance with the invention, message channel activity is measured by detectors 52 and 53 provided for the separate paths 30–1 and 30–2 of the transmission link 30. When low states of activity are detected simultaneously for opposed direction of propagation, both the interrogation and the reply can be initiated during the same time slot. Further, when the detected state of the message on the lower path permits a prediction of continued inactivity, the reply to an interrogation addressed to the left-hand switching network 10 does not have to be stored there to await a subsequent interpolation opportunity. Instead, the reply can be returned directly to the controller 50—where it is readily identifiable as being the reply to the earlier interrogation.

Consider an interrogation of the left-hand switching network to determine an operating signal level there. The desired signal level may be given by the meter reading of an appropriate instrument included in a monitor station M. In that event, the interrogation can be accomplished by having a monitor gate unit 54 operate in place of the line gate unit 51 during the selected time slot so that a mnoitor gate switch 11–M is closed in place of the message gate switch 11–A. The reply, which is given by the code counterpart of the monitor signal level, is then applied to the transmission link 30 during the selected time slot.

To measure channel activity, the detectors 52 and 53, which are synchronized by a system timing source (not shown), include decoders 52–*a* and 53–*a* for converting the pulse code groups on the paths 30–1 and 30–2 of the transmission link 30 into amplitude samples. Relative inactivity is evidenced by sample amplitudes falling below prescribed thresholds of low amplitude indicators 52–*b* and 53–*b*.

As shown, the interrogation is of the left-hand network 10. Consequently, there is no interference with message reception if a time slot with a code group corresponding to a sample of substantially zero amplitude is diverted during the interrogation and the amplitude indicator 53–*b* of the upper path detector 53 responds accordingly.

On the other hand, the reply to the interrogation will experience a delay of at least one frame or time slot cycle before being received at the controller 50. Hence, it is desirable that the channel be inactive on the lower path 30–1 until then. For this purpose, the indicator 52–*b* of the lower path detector is set to respond to a low level of activity, from which a prediction of continued message behavior can be made. Such a level corresponds, for example, to that of channel noise. Since the indicator responses can occur in any message channel, they are catalogued according to time slot in a commutator 55 which may be of the electronic variety. For purposes of illustration, the commutator is represented by a wiper arm and three segments that are swept in turn along their peripheries with the traversal time of each segment corresponding to a time slot interval. Thus, the illustrative system has been assumed to have three time divided message channels, i.e., three time slots per frame or time division cycle, one of which is adopted for interpolation signaling.

While each output from the commutator 55 signifies an interval of inactivity during a message interval, this indication, of itself, is insufficient to permit a prediction of continued inactivity.

However, if continued inactivity is indicated for successive cycles of a time slot interval, the probability is great that the inactivity will continue through another time slot cycle. A measure of inactivity is obtained by recording, in a count and hold unit 56, a small number of successive counts falling below the threshold level. On attainment of a preselected count, an output from a counter 56–*a* appears at an AND gate 57. Because of an EXCLUSIVE OR gate 56–6 that precedes the counter 56–*a*, the preselected count output is held for succeeding inputs to the count and hold unit 56. For any other condition the counter is caused to advance for each input. If an ouput is simultaneously present from the upper path detector 53, the monitor gate unit 54 is energized.

The preselected count is made sufficiently short to verify the recurrence of an inactive interval, but sufficiently long to assure, with a high degree of probability, that the inactivity will endure for at least one additional time slot interval. Since it is possible for a message wave to be sampled at several successive zero crossings, a count of three is adequate. Provision is made for resetting the counter 56–*a* during the absence of a response by an inhibitory AND gate 56–*c*. When neither successive responses nor the preset count output are available at the inhibitory AND gate 56–*c*, the counter 56–*a* is reset.

Once the monitor gate unit 54 is energized, a preassigned code group from a monitor number generator 54–*a* is entered into a monitor gate register 54–*b* during the time slot of the channel being diverted. For convenience, the monitor gate number is a code word constituted entirely of "one's." Consequently, because of an OR gate 58 to which the monitor gate output is applied in conjunction with the line gate output, the control code group during the diverted time slot is also constituted of "one's" and is derived by having the monitor gate number override the corresponding line gate number at the OR gate 58. Hence, the code group received at the selector 12, instead of opening the gate 11–*a* normally connected to the message source during the appropriated time slot, opens the gate 11–M connected to a monitor station M.

In order that all code words arrive at the left-hand switching network 10 at appropriate times to enter their respective stations, the upper path 30–2 includes a delay unit 59. This unit retards the code words by the duration of the time required for the logical operations that take place in the control unit and at the switching network.

After the monitor gate switch 11–M has been closed, the monitor signal level is encoded and applied to the lower path 30-1 of the transmission link 30. Since, during this time slot, no significant change in amplitude level is to be expected at the second station A′ normally connected to the lower path 30–1, it is not deprived of any significant information. However, the monitor signal level code produces an extraneous response at the second station A′ if it is allowed to pass in the normal way. Hence, an inhibit gate 60, which responds during the return time of the monitor code word, opens the lower path 30–1 for a duration controlled by monitor gate pulse signals which have passed through a delay unit 61. These gating signals also act in conjunction with the monitor pulse signals to operate an AND gate 62 of a monitor decoder 63. The output of the decoder, which is the desired reply to the interrogation, is translated by a monitor indicator 64—completing the signaling process.

Other adaptation and realization of communications signaling, including its extension to monitoring the various line gates of unserved stations in determining priority requests for service when all channels of a system are busy, will occur to those skilled in the art.

What is claimed is:

1. Signaling apparatus which comprises a system for transmitting messages in opposed directions of propagation, means for detecting a preassigned condition of a message propagated in one direction, means for detecting a similar condition of a message propagated in the other direction and means responsive to the coincidence of the detected conditions for transmitting a signal in one of said directions.

2. Switching apparatus which comprises means for propagating messages in opposed directions, means for switching said messages according to a prescribed sequence, means for detecting a preassigned condition of a message being propagated in one direction, means for detecting a similar condition of a message propagated in the other direction and means responsive to the coincidence of the detected conditions for altering said switching sequence.

3. Interpolation signaling apparatus which comprises a system for propagating messages in opposed directions, means for detecting momentary inactivity in a message propagated in one direction, means for detecting similar inactivity in a message propagated in the other direction and means responsive to the coincident responses of the two detecting means for interpolating an auxiliary message into the detected interval of inactivity.

4. Interpolation signaling apparatus which comprises means for transmitting a message along a sending path, means for transmitting the reply to said message along a receiving path, means for detecting a momentary interval of inactivity on said sending path, means for detecting similar interval of inactivity on said receiving path, means responsive to the detection of simultaneous inactivity on the sending and receiving paths for interpolating a signal thereon during said interval.

5. In a two-way multiplex communication system including a central control unit, a remote unattended switching network, an outgoing path extending from the control unit to the switching network adapted to carry in each of a plurality of channels, a message wave characterized by intermittent amplitude zeros and a return path extending from the network to the unit and adapted to carry, in each of said channels, a related message wave, means for monitoring a specified channel in said return path to observe a condition of comparative inactivity, means for simultaneously monitoring said channel in said outgoing path to observe a single amplitude zero, means responsive to occurrence of said single amplitude zero in the outgoing path during an observed inactive condition in the return path for seizing said channel and for dispatching therein a control signal carrying a question to which the remote network is equipped to reply, and means at said remote network responsive to said control signal, for replying to said question over said channel in the return path before the expiration of said inactive condition.

6. Time division signaling apparatus which comprises
a plurality of switching networks,
a plurality of message stations connected to said networks,
a transmission link having a plurality of paths and interconnecting said networks,
and means included in said link for controlling said networks comprising
means connected to one path of said link for detecting the state of message activity thereon,
means connected to another path of said link for detecting the state of message activity thereon,
means connected to the first mentioned detecting means for predicting the future state of activity of said one path,
means interconnecting one of said switching networks jointly with the predicting means and the second mentioned detecting means for interrogating said one of said switching networks,
and means connected to said link for receiving a reply from the interrogation of said one of said switching networks.

7. Apparatus as defined in claim 6 wherein each switching network includes
a plurality of line gate switches interconnecting said link with said message stations and selector means for selectively closing said line gate switches,
and said controlling means includes means for operating said selector means.

8. Apparatus as defined in claim 7 wherein the operating means comprises
a line gate register,
means for inserting a code group of control pulse signals into said register,
means for circulating the inserted control pulse signals of said register,
said circulating group of control signals selectively actuating said selector means,
and the operating means includes means for overriding the group of control pulse signals presented to said selector means,
thereby to operate a preassigned, normally non-operated one of said gates.

9. Apparatus as defined in claim 6 wherein the predicting means comprises
means for recording the number of successive time division signals falling below the threshold level of said first mentioned detecting means,
and means responsive on attainment of a preselected number of said signals for activating the interrogating means.

References Cited by the Examiner

UNITED STATES PATENTS

| | | | |
|---|---|---|---|
| 2,207,711 | 7/40 | Berger et al. | 179—4 |
| 2,740,838 | 4/56 | Pierce | 179—15 |
| 2,912,508 | 11/59 | Hughes | 179—15 |

DAVID G. REDINBAUGH, *Primary Examiner.*